United States Patent [11] 3,626,303

[72] Inventor Milton E. Wilcox
Mesa, Ariz.
[21] Appl. No. 69,353
[22] Filed Sept. 3, 1970
[45] Patented Dec. 7, 1971
[73] Assignee Motorola, Inc.
Franklin Park, Ill.

[54] NOISE INVERSION CIRCUIT

14 Claims, 2 Drawing Figs.

[52] U.S. Cl. .......... 325/474, 178/DIG. 12, 325/476, 325/482, 325/324, 328/169
[51] Int. Cl. .......... H04b 1/12
[50] Field of Search .......... 325/473, 474, 475, 476, 479, 482, 322, 323, 324; 328/165, 168, 169; 178/7.3 R, DIG. 12

[56] References Cited
UNITED STATES PATENTS
3,441,669 4/1969 Janson et al. .......... 178/DIG. 12

*Primary Examiner*—Robert L. Griffin
*Assistant Examiner*—Albert J. Mayer
*Attorney*—Mueller & Aichele

ABSTRACT: A noise inverter for use in a television receiver includes an input circuit for applying the composite video signal to a delay circuit and to a noise inverter gate, in the form of a PNP transistor, having a conduction threshold established by a storage capacitor. When the gate transistor is rendered conductive in response to noise pulses of sufficient magnitude, a clamping circuit driven by the gate operation to clamp the delayed composite signal to a predetermined magnitude. The discharge time of the capacitor establishes the maximum time interval the noise inverter is operative for prolonged signals exceeding the noise threshold.

PATENTED DEC 7 1971 3,626,303

INVENTOR
MILTON E. WILCOX
BY Mueller & Aichele
ATTORNEYS

NOISE INVERSION CIRCUIT

BACKGROUND OF THE INVENTION

In television receivers, the composite television signal is applied to a sync separator circuit which responds to the synchronizing signal portions to separate them from the remainder of the composite signal to operate the vertical and horizontal sweep systems of the receiver. The separation is made possible by the fact that the synchronizing signal portions extend in a predetermined direction outside of the range normally occupied by the remainder of the information content of the video signal. Impulse noise, which may be superimposed on the composite signal creates a problem in the operation of the sync separator since the input pulse noise extends in the same direction of the synchronizing signal portions of the signal. If such impulse noise is not prevented, it may be separated in the sync separator circuit and applied to the sweep systems, causing the television receiver to go out of vertical or horizontal synchronization. Thus, it has been common practice to employ threshold sensitive circuits, operative in response to signals extending beyond the tips of the expected synchronizing signal portions of the signal, for producing inverted pulses which, when added to the composite signal, cancel the unwanted noise or limit the noise to a predetermined magnitude. Such noise inversion or noise cancelling circuits prevent erroneous operation of the sync separator circuit.

The noise threshold generally must be arbitrarily predetermined and cannot readily be adjusted or varied to meet different operating conditions of the receiver. In addition, noise gates which are responsive only to a predetermined magnitude of noise signals can "latch-up" due to the video being trapped under the noise threshold, and the receiver operation becomes paralyzed due to video over-shoot during flutter and the like. Also, since it is necessary to detect a predetermined threshold of noise before operating the noise gate or inverter, short spikes of noise impulses still remain in most noise cancelled or noise inverted video signals due to the fact that the initial portion of the noise pulse necessary to effect the detection passes through the system prior to the inversion operation.

As a consequence, it is desirable to provide a noise inverter circuit which inverts substantially the entire noise impulse and which is not subject to undesirable latching during intervals when the video signal is under the noise threshold normally utilized to operate the noise inverter circuit. In addition, it is desirable to provide a noise inverter circuit which is suitable for integrated circuit implementation, since it is becoming increasingly desirable to provide as much as possible of the television receiver circuitry in an integrated circuit form.

SUMMARY OF THE INVENTION

It is an object of this invention to provide an improved noise inversion circuit.

It is an additional object of this invention to provide a noise inversion circuit suitable for implementation as an integrated circuit.

It is another object of this invention to disable a noise inversion circuit for signals in excess of the noise threshold level persisting greater than a predetermined maximum interval of time.

It is a further object of this invention to add a noise cancelling or clamping pulse to a video signal delayed after detection of the noise in order to invert or clamp substantially the entire noise pulse including the leading edge thereof.

In accordance with a preferred embodiment of the invention a noise inversion circuit includes a delay circuit and a gate circuit having first and second inputs, with composite signals subject to undesired noise pulse portions outside a predetermined desired operating range being supplied to one of the inputs of the gate circuit and to the delay circuit. The other input of the gate circuit is provided with a threshold determining potential by a charge storage means which is coupled with a source of DC potential to establish a threshold for the gate. The gate circuit is rendered operative to produce an output pulse in response to a predetermined relationship of the magnitudes of the potentials applied to the first and second inputs, with the output pulse operating circuitry for shunting the signals appearing at the output of the delay circuit for the duration of the output pulse. The length of delay imposed by the delay circuit and the duration of the output pulse are selected so that the output pulse substantially coincides with the undesired noise portion which is to be removed from the signal appearing at the output of the delay circuit.

DETAILED DESCRIPTION

Figures 1, 2:
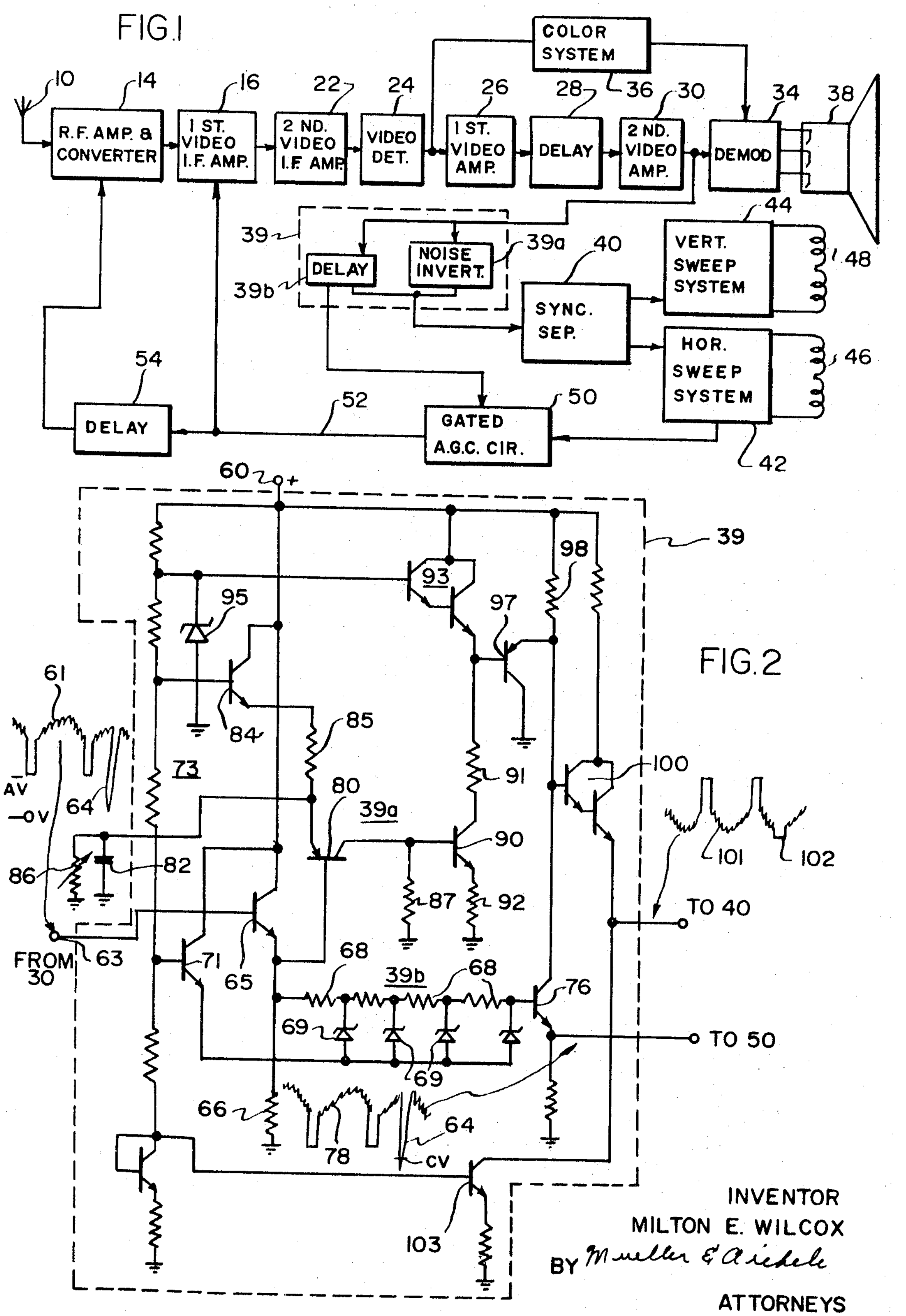
FIG. 1 is a block diagram of a television receiver in which a noise inversion circuit may be employed.
FIG. 2 is a detailed circuit diagram of a noise inversion circuit in accordance with a preferred embodiment of this invention.

Referring now to the drawing, there is shown in FIG. 1 a typical color television receiver in which an incoming signal is received by an antenna 10 and is applied to a radio frequency amplifier and converter stage 14, which amplifies and reduces the frequency of the received signals to provide intermediate frequency (IF) signals. These IF signals then are amplified in a series of video IF amplifiers, indicated in the drawing as first and second IF amplifiers 16 and 22. The output of the second IF amplifier 22 is detected in a video detector stage 24 to provide a composite video signal, with the brightness components and synchronizing components in the video signal being amplified in a first video amplifier circuit 26 and also being applied to the input of a color-processing system 36 responsive to the color signal components of the detected video signal.

The amplified brightness and synchronizing signal components from the output of the first video amplifier stage 26 are delayed in a delay circuit 28, for purposes well known to those skilled in the art, are amplified in a second video amplifier 30, and are applied to one input of a direct demodulator circuit 34. The composite chroma signal components, after being processed in the color system 36, are applied to another input of the demodulator 34, which produces the red, blue, and green video voltages directly on three outputs coupled with the three different cathodes of a color cathode ray tube 38.

In addition to providing the brightness signal components to one of the inputs of the demodulator circuit 34, the second video amplifier stage 30 supplies the composite video signal to a noise gate 39, including a noise inverter 39*a* and a delay circuit 39*b*, with noise impulses in excess of the signal synchronizing components of the composite signal being removed at the output of the delay circuit 39*b* in the noise gate 39. The noise-free video signals then are applied to a synchronizing signal separator circuit 40, which supplies the horizontal and vertical synchronizing signal components to horizontal and vertical sweep systems 42 and 44, respectively. The sweep systems 42 and 44 develop the horizontal and vertical sweep signals in a horizontal deflection winding 46 and a vertical deflection winding 48, each of which is disposed on the neck of the cathode ray tube 38.

The output of the delay circuit 39*b* also is applied to a gated automatic gain control (AGC) circuit 50, which is gated by the horizontal retrace pulse to develop a gain control signal during the gated intervals. This gain control signal appears on a conductor 52 and changes in amplitude according to the peak amplitude of the synchronizing pulse components present during the gating interval. The strength or magnitude of the synchronizing pulse components is in turn dependent upon the strength of the incoming signals appearing at the antenna 10, so that the voltage appearing on the lead 52 is representative of the input signal strength. Depending on the nature of the circuit with which the gain control circuit 50 is used, the gain control voltage on the lead 52 may be either a forward or reverse gain control voltage and is applied to a first video IF stage 16 and is delayed by a suitable delay circuit 54 and applied to the RF and converter stage 14. Thus, the gain control voltage operates initially to control the gain of the video IF stage 16 and, for increased signal levels, operates to control the gain of the RF and converter stage 14 in a manner which is well known.

Referring now to FIG. 2, there is shown in detail the delay and noise inverter circuits 39*a* and 39*b* which are illustrated in block form in FIG. 1. The components enclosed in dotted lines in FIG. 2 all may be formed on an integrated circuit chip, which may be a separate chip as illustrated in FIG. 2 or may be part of a larger integrated circuit including additional circuit functions of the television receiver.

A positive operating potential is applied to an input terminal or bonding pad 60 and may be derived from any suitable source within the television receiver. Input signals, such as the composite signals shown by waveform 61 obtained from the output of the second video amplifier 30, are applied to the input terminal 63 of the noise gate circuit 39. These signals have, as the most negative-going portion thereof the synchronizing signal portions, the tips of which are at some voltage AV above ground, with the remainder of the desired video information signal (including the synchronizing signal portions) extending above the most negative-going tips of the synchronizing signal portions in a second higher voltage range. This composite signal, however, is subject to unwanted noise pulses or noise spikes which extend below the most negative-going portion AV of the synchronizing signal portions, with one such undesired noise pulse being indicated as 64 in the waveform 61.

The composite signal 61, including the unwanted noise pulses 64, is applied from the input terminal 63 to the base of an NPN emitter-follower transistor 65, the emitter of which is coupled through a suitable resistor 66 to ground and the collector of which is connected to the B+ terminal 60. As a consequence, the signals appearing on the emitter of the transistor 65 are of the same configuration as the signals 61, but are translated downwardly by the amount of the base emitter drop ( 1 ) of the emitter-follower transistor 65.

These signals appearing on the emitter of the transistor 65 then are applied to an input of the delay line 39*b*, which is in the form of an R–C delay circuit including a plurality of series-connected resistors 68, the junctions between which each are coupled to the cathode of a back-biased zener diode 69. The diodes 69 are operated as capacitors, with an anode biasing potential being supplied from the emitter of a biasing transistor 71 the base of which is connected to a suitable point on a resistive voltage divider 73, connected between the terminal 60 and ground to provide an operating bias for the transistor 71. The collector of the transistor 71 is connected to the positive input terminal 60, so that the diodes 69 are biased with a near zero voltage there across for the most negative-going portions of the input signals obtained from the emitter of the emitter-follower transistor 65.

The multisection delay line 39*b*, delays the video signal applied to it, with the delayed signal being coupled to the base of an NPN output transistor 76, the emitter of which provides the delayed composite video signal, in the form of a noninverted waveform 78, to the gated AGC-circuit 50. The biasing of the zener diodes 69 is such that noise pulses in excess of a predetermined amount are clipped at a voltage level CV, indicated on the waveform 78, so that the affect of these noise pulses on the gated AGC-circuit 50 is minimized.

Even though the delay line 39*b* provides for clipping of the noise pulses, the clipping level necessarily must be at a more negative potential than the negative most portion of the synchronizing signal; so that the signal appearing on the emitter of the output transistor 76 is unsuitable for application to the synchronizing signal separator circuit 40. In order to eliminate the noise pulses 64 from the signals applied to the synchronizing separator circuit 40, the composite signals appearing on the emitter of the input transistor 65 also are applied to the base of a PNP-gate transistor 80. The emitter of the PNP-gate transistor 80 is provided with a threshold biasing potential by the charge stored on a threshold establishing capacitor 82, coupled between the emitter of the transistor 80 and ground. The capacitor 82 is provided with a charging path from the emitter of an PNP-transistor 84, the base of which is connected to a reference point on the voltage divider 73 and the emitter of which is connected through a resistor 85 to the junction of the capacitor 82 with the emitter of the transistor 80.

Adjustment of the threshold determined by the charge on the capacitor 82 may be provided by a variable resistor 86, connected in parallel with the capacitor 82, if so desired. The resistor 86, however, is not necessary if a predetermined fixed charge is desired on the capacitor 82 for all conditions of operation of the circuit, with the particular charge being stored then being dependent upon the control point of the voltage divider 73 which is connected to the base of the transistor 84. The resistor 85, of course, controls the rate of charge of the capacitor 82 in accordance with the magnitude of resistance thereof.

Whatever the charge stored on the capacitor 82, the transistor 80 is rendered conductive only in response to signals applied to the base thereof which are sufficiently negative to forward bias the emitter-base junction of the transistor 80. Thus, the threshold established by the charge on the capacitor 82 must be selected to be sufficiently below the most negative-going portion of the synchronizing signal components of the composite signal 61 so as to prevent operation of the transistor 80 in response to the synchronizing signal components of the composite signal.

When a noise pulse 64 of sufficient magnitude to forward bias the transistor 80 is received, the transistor 80 becomes conductive and provides a discharge path for the capacitor 82 through the emitter-collector junction of the transistor 80 and a resistor 87 to ground. The voltage across the resistor 87, upon discharge of the capacitor 82, is sufficient to forward bias an NPN-transistor transistor 90. The transistor 90 then provides a current path to ground through collector and emitter resistors 91 and 92, respectively, for the output of an NPN Darlington amplifier 93, the input base of which is provided with a stabilized DC reference voltage across a zener diode 95. Current flowing in this path forward biases a lateral PNP noise gate output transistor 97, operated as an emitter-follower, with the emitter thereof coupled through a resistor 98 to the positive potential input terminal 60. The voltage appearing on the emitter of the transistor 97 is established by the voltage across the reference zener diode 95 and is selected to clamp the potential on the emitter of the transistor 97 to a relatively positive level within the normal range of the video information signals of the input waveform 61.

It should be noted that this clamping potential applied from the emitter of the transistor 97 is coupled to the collector of the output transistor 76, which produces an inverted version of the waveform 78 obtained from the delayed signal after passing through the delay circuit 39*b*. The delay imposed by the delay circuit 39*b* is selected to be such that conduction of the transistor 97 commences substantially in coincidence with the initial portion of the leading edge of the undesired noise pulse 64; and the operation of the circuit including the transistors 90 and 97, is such as to stretch the output pulse from the gate transistor 80, so that the transistor 97 is conductive for an interval which is greater than the base portion of the average noise pulses encountered in the operation of the system.

The combined signal provided from the collector of the transistor 76 and the emitter of the transistor 97 is applied to the input base of an NPN Darlington amplifier circuit 100, providing an output signal waveform 101 to the sync separator circuit 40. The Darlington circuit 100 is provided with operating current from a current source 103. Since the transistors 80 and 90 provide a double inversion of the noise pulse applied to the base of the emitter-follower transistor 97, and since the transistor 76 provides a single inversion of the composite video signal, the gated noise pulse at the emitter of the transistor 97 is inverted relative to the video signal appearing on the collector of the transistor 76. Since the gated noise pulse coincides with the portion of the video signal occupied by the signal noise pulse 64, conduction of the transistor 97 clamps the signal to produce a noise inverted portion 102 in the signal waveform 101, the signal portion 102 appearing in the position occupied by the noise pulse 64 in the input signal waveform 61. The signal portion 102 is clamped at a level which clearly prevents any operation of the synchronizing signal separator circuit 40 from taking place in response thereto, since it is well below the now-positive portions of the tips of the synchronizing signal portions of the signal waveform 101.

Normally, the noise pulses, such as the pulse 64, are of very short duration; so that the transistor 80 is rendered nonconductive immediately upon termination of the noise pulses, and the threshold determining capacitor 82 commences recharging to the preestablished threshold level which is determined by the circuit parameters previously described. If, however, the signal should for some reason drop below the noise threshold level determined by the charge on the capacitor 82 and remain at this level for a length of time sufficient to enable full discharge of the capacitor 82 through the conductive PNP-transistor 80, the relative values of the resistors 85 and 87 are selected so that insufficient gain is provided by the transistor 80 to turn on the transistor 90. The transistor 90 then once again becomes nonconductive, irrespective of the fact that the entire signal level is below the noise threshold which normally renders the transistor 80 conductive.

When a prolonged signal condition of this type exists, the noise circuit is disabled, since the transistor 97 also is rendered nonconductive; and the only output signals applied to the input of the Darlington output amplifier 100 are those obtained from the collector of the transistor 76. As a consequence, the discharge time of the capacitor 82, as determined by the initial charge stored thereon and the value of the resistor 87, establishes the maximum length of time or duration of a noise pulse which may render the noise inverting circuit operative. This prevents latching up of the noise gate circuitry due to signal conditions such as video over-shoot during flutter and the like.

The high-dynamic impedance of the collector of the transistor 76 relative to the resistor 98 also permits the noise inversion for the signals appearing on the collector of the transistor 76 to take place without affecting the signals appearing on the emitter thereof. Of course, if it were desired to provide noise-free or noise inverted signals to the input of the gated AGC-circuit 50, such signals also could be obtained from the output of the Darlington amplifier circuit 100.

I claim:

1. In a wave signal receiver responsive to a composite signal including desired signal portions within a predetermined range of magnitudes but subject to undesired noise portions outside said predetermined range, a noise inverting circuit including in combination:

- delay circuit means providing a predetermined delay to signals applied thereto;
- charge storage means coupled with a source of DC potential for establishing a predetermined threshold potential;
- gate circuit means having a first input coupled with the charge storage means and having a second input, the gate circuit means producing an output pulse in response to a predetermined relationship of the potential magnitudes applied to the first and second inputs;
- means for supplying said composite signal to the delay circuit means and to the second input of the gate circuit means, the gate circuit means providing an output pulse in response to noise portions of the composite signal of a magnitude sufficient to establish said predetermined relationship;
- means coupled with the output of the delay circuit means for utilizing said delayed composite signals; and
- control means responsive to said output pulse for applying a predetermined signal level to the utilizing means for the duration of said output pulse.

2. The combination according to claim 1 wherein the control means includes means for stretching the duration of the output pulse from the gate circuit means.

3. The combination according to claim 1 wherein the control means for applying a predetermined signal level to the utilizing means overrides the output of the delay circuit means for the duration of said output pulse.

4. The combination according to claim 1 wherein the gate circuit means includes first switching means and first impedance means coupled to the charge storage means for providing a discharge path therefor, the first switching means being rendered conductive in response to said predetermined relationship of the potential magnitudes applied to the first and second inputs with the first impedance means establishing the time required to discharge the charge storage means from the predetermined threshold potential to a reference potential, the discharge time controlling the maximum duration of said output pulse.

5. The combination according to claim 4 further includes second impedance means, wherein the charge storage means is coupled with the source of DC potential through the second impedance means at a first junction and wherein the gate circuit means includes a first transistor having base, emitter, and collector electrodes, the emitter-collector path of which is coupled between the first junction and one end of the first impedance means, the other end of which is connected to a point of reference potential, the means for supplying the composite signal is coupled with the base electrode of the first transistor, and the collector electrode of the first transistor is coupled with the control means.

6. The combination according to claim 5 wherein the control means includes a second transistor having base, emitter, and collector electrodes, with the collector-emitter path of the second transistor being coupled with the output of the delay circuit means, and the collector of the first transistor being coupled with the base of the second transistor.

7. The combination according to claim 6 wherein the second transistor is nonconductive with the first transistor being nonconductive and wherein the potential on the collector of the first transistor provided by the discharge of the charge storage means through the first transistor and the first impedance means is of a magnitude to forward bias the second transistor for a maximum time interval determined by the parameters of the discharge path for the charge storage means.

8. The combination according to claim 6 wherein the first and second transistors are of a first conductivity type, the collector of the first transistor is connected at a second junction to said one end of the first impedance means, and the charge storage means is a capacitor connected between the emitter of the first transistor and a point of reference potential, the combination further including a third transistor of opposite conductivity type to that of the first and second transistors and having collector, base, and emitter electrodes, with the collector electrode of the third transistor being coupled with the base electrode of the second transistor, the emitter electrode of the third transistor being coupled with a point of reference potential, and the base electrode of the third transistor being coupled with the second junction.

9. The combination according to claim 6 further including means coupled with the base electrode of the second transistor and rendered operative in response to said output pulse to cause a predetermined DC potential to be applied to the base electrode of the second transistor, wherein the collector electrode of the second transistor is coupled with said source of DC potential and the emitter electrode of the second transistor is coupled with the output of the delay circuit means.

10. The combination according to claim 6 wherein the duration of the delay imposed on the composite signal by the delay circuit means is sufficient that conduction of the second transistor in response to said output pulse overlaps the occurrence of said undesired noise portion of the signal appearing at the output of the delay circuit means.

11. For use with a system responsive to an input signal having desired signal portions within a predetermined range of magnitudes but subject to undesired noise portions outside said predetermined range, a noise inverting circuit including in combination:

delay circuit means for providing a predetermined delay to signals applied thereto;

charge storage means coupled with a source of DC potential for establishing a predetermined threshold potential;

first transistor means having emitter, base, and collector electrodes, with the emitter electrode being coupled with the charge storage means and having said threshold potential applied thereto;

means for applying the input signal to the base of the first transistor and to the delay circuit means, signal portions within said predetermined range of magnitudes being insufficient to forward bias the first transistor into conduction, but with noise portions of a predetermined magnitude outside said predetermined range of magnitudes being sufficient to forward bias the first transistor into conduction;

a second transistor having base, collector, and emitter electrodes, with the base electrode being coupled to the output of the delay circuit means and the emitter electrode being coupled with a point of reference potential, delayed signals appearing on the emitter of the second transistor;

means coupling the collector of the second transistor with a source of operating potential;

means coupling the collector of the second transistor with utilization circuit means, the collector of the second transistor providing inverted delayed signals to the utilization means;

a third transistor having base, collector, and emitter electrodes, with the emitter-collector path thereof being coupled between a point of reference potential and the collector of the second transistor; and means coupling the collector of the first transistor with the base of the third transistor, with conduction of the first transistor enabling the charge storage means to discharge through the collector-emitter path of the first transistor, rendering the third transistor conductive for a predetermined time interval, thereby clamping the signal level on the collector of the second transistor for said time interval.

12. The combination according to claim 11 wherein the charge storage means includes a capacitor with first and second terminals, and at least first impedance means coupled between a source of charge potential and a first terminal of the capacitor, the second terminal of which is coupled to a point of reference potential, the first terminal of the capacitor also being coupled to the emitter electrode of the first transistor; the combination further including second impedance means coupled between the collector of the first transistor and said point of reference potential for establishing a discharge path for the capacitor when the first transistor is conductive, the charge stored by the capacitor and the magnitude of the second impedance means determining the maximum time interval that the potential developed across the second impedance means upon discharge of the capacitor is sufficient to forward bias the third transistor, and wherein the delay imparted to the signals by the delay circuit means is such that conduction of the third transistor substantially overlaps the noise pulse causing conduction of the first transistor.

13. The combination according to claim 12 further including a fourth transistor having base, collector, and emitter electrodes, the base electrode of the fourth transistor being coupled to the junction between the second impedance means and the collector of the first transistor, with the collector of the fourth transistor being coupled with the base of the third transistor, the first and third transistors being of one conductivity type and the fourth transistor being of an opposite conductivity type.

14. The combination according to claim 13 wherein the emitter of the third transistor is coupled with the collector of the second transistor and further including means for establishing a predetermined potential on the base of the third transistor with the fourth transistor being conductive, thereby establishing a predetermined potential level on the emitter of the third transistor for said predetermined time interval.

* * * * *